United States Patent [19]
Fell

[11] 3,967,320
[45] June 29, 1976

[54] ARRANGEMENT FOR GUIDING A RAPIDLY ROTATING RECORD CARRIER FOIL

[75] Inventor: Wolfgang Fell, Konstanz, Germany

[73] Assignee: Licentia Patent-Verwaltungs-G.m.b.H., Frankfurt am Main, Germany

[22] Filed: July 30, 1974

[21] Appl. No.: 493,345

[30] Foreign Application Priority Data
Aug. 2, 1973  Germany............................ 2339131

[52] U.S. Cl.................................. 360/102; 360/99; 360/107; 360/109
[51] Int. Cl.².................. G11B 15/64; G11B 5/012; G11B 21/04; G11B 21/18
[58] Field of Search ............... 360/99, 109, 135, 86, 360/102, 107

[56] References Cited
UNITED STATES PATENTS

| | | |
|---|---|---|
| 3,166,997 | 1/1965 | Barcia et al.......................... 360/102 |
| 3,599,192 | 8/1971 | Rabek.................................. 360/86 |
| 3,603,742 | 9/1971 | Schüller.............................. 360/102 |
| 3,703,713 | 11/1972 | Pohm et al.......................... 360/102 |

*Primary Examiner*—Robert S. Tupper
*Attorney, Agent, or Firm*—Spencer & Kaye

[57] ABSTRACT

In a system for guiding a rapidly rotating record carrier foil, by establishing a flow of air, so as to give the foil a stabilizing curvature which is stationary in space and which has a crest line extending along a diameter of the foil, the desired curvature is created by providing guide elements in regions along such crest line, and a surface disposed to establish air flows under the foil in sectors centered on a line perpendicular to the crest line, and by not guiding the foil at all in regions between the sectors and extending to the edges of the foil.

8 Claims, 3 Drawing Figures

ARRANGEMENT FOR GUIDING A RAPIDLY ROTATING RECORD CARRIER FOIL

BACKGROUND OF THE INVENTION

The present invention relates to systems for playing back foil-type recordings, and particularly to an arrangement for guiding a rapidly rotating foil-type record carrier with the aid of air gap streams in such a manner that the foil conforms to a curved surface which is stationary in space and which presents a crest extending along a diameter of the carrier.

Such an arrangement is disclosed, for example, in U.S. Pat. No. 3,603,742 to Eduard Schuller, and includes a playback surface in the form of a curved disc which forms an air gap with the entire surface of the record carrier foil when the latter is rotating at high speed. In this air gap centrifugal forces produce an air flow which pulls the foil close to the disc and thus produces the above-mentioned curvature in the foil. This curvature enhances stabilization of the position of the rapidly rotating foil.

SUMMARY OF THE INVENTION

It is an object of the present invention to provide certain improvements over the above-described arrangement.

According to the present invention, an arrangement of the above-mentioned type is modified in such a manner that the record carrier foil is guided by guide elements in regions extending along the crest line of the curved surface to which the foil conforms, while in sectors whose center lines are substantially perpendicular to such crest line, the foil is guided by air gap flows above a surface, and in sectors therebetween which extend to the edge of the foil, it is not positively guided at all.

The arrangement according to the present invention includes a surface which serves to form an air gap with the foil and which forms a bar through which the foil drive hub passes, the length of the bar, which extends substantially perpendicular to the crest line, is greater, and its width is less, than the diameter of the foil. In addition, the bar surface is preferably curved in the sense of the curvature to be obtained for the foil.

In further accordance with the invention, the guide elements acting in the areas of the crest lines are adjustable.

According to preferred embodiments of the invention, the guide elements are provided to act in regions of the crest line on both sides of the center of rotation of the foil, with at least one of the guide elements being a scanning head. The scanning head is displaceable along the crest line.

Furthermore, the guide elements have guide surfaces which effect the formation of a guiding air cushion and further when a scanning head is disposed on only one radius, its guide surface has a greater curvature than the guide element acting on the other, diametrically opposed, radius.

DESCRIPTION OF THE PREFERRED EMBODIMENTS

Figure 1:
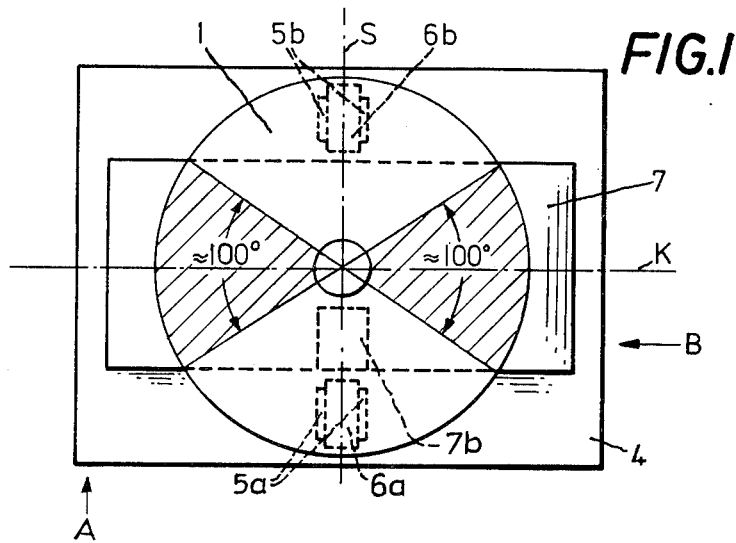
FIG. 1 is a schematic top plan view of one preferred embodiment of the invention.
Figure 2:
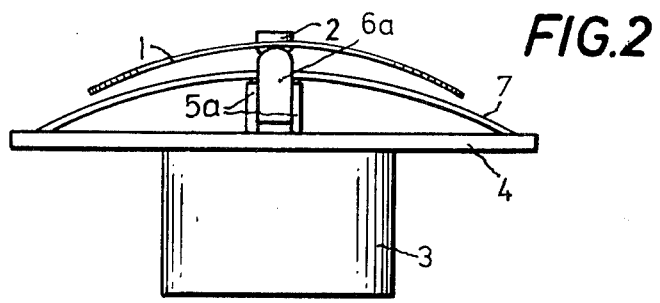
FIG. 2 is an elevational view taken in the direction A of FIG. 1.
Figure 3:
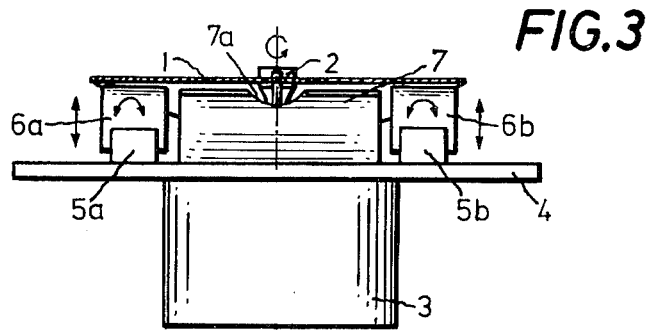
FIG. 3 is an elevational view taken in the direction B of FIG. 1.

As shown in FIGS. 1 to 3, a circular, thin foil 1 which contains recordings, e.g. data to be played back, is provided for this purpose on its underside with a magnetizable layer and is placed, by means of a clamping device 2, on the shaft of a motor 3 which in operation causes the foil 1 to rotate very rapidly.

While in the description which follows it is assumed that the foil 1 is rotating, the various geometric indications such as diameter, radius, direction etc., refer to the foil circle at rest.

Two mounts 5a and 5b fastened to a base plate 4 are each provided with a respective one of heads 6a and 6b, which are displaceably and rotatably mounted as shown by arrows in FIG. 3. The top surfaces of these heads, which extend in the direction of diameter S, have an upwardly convex curvature with a linear crest disposed on diameter S. These top surfaces, which will be called head levels hereinafter, serve as the guide surfaces for the foil 1 and can be adjusted, in order to guide the lower surface of the foil, by adjusting heads 6a and 6b in the manner indicated above. The curvatures of the surfaces are so designed that the guiding of the foil is not effected by mechanical contact but by means of an air cushion formed as a result of the rapid rotation of the foil.

In the direction of diameter K, which is perpendicular to diameter S, there extends a bar 7 which is fastened to base plate 4 and which is within an approximately rectangular outline when seen in plan view. The bar 7 has an upwardly convexly curved surface with an opening 7a at its center portion which permits the passage of the drive shaft for the foil, as well as the passage of air. The bar 7, which extends in the direction K and is symmetrical with respect to S, has a length which is greater than the diameter of foil 1, while the width of the bar is less than the diameter of the foil. Bar 7 is centered on diameter K and its width is selected so that the sector angles of the two sectors, shown by light hatching in FIG. 1, where foil 1 and the area of bar 7 are adjacent one another, are each 100°. The curvature of the surface of bar 7 which is symmetrical to diameter S can geometrically be wound off into a plane; its linear crest lies below line S.

The two circular segments, centered on line S, and outside the rectangular outline of bar 7, where no bar surface lies below foil 1, are free for the disposition of the already mentioned heads 6a and 6b. At least one of these heads, in the present case it is assumed to be head 6a, is designed as a scanning head for recording or playing back the foil recordings. The other head 6b may also be such a head or, as assumed in the present case, it may merely be a guide head.

The crest lines of the head levels of the two heads 6a and 6b are adjusted to be approximately aligned and disposed along line S so that they lie somewhat above the crest line of the surface of bar 7, which also extends in the direction along line S.

During rapid rotation of foil 1, air coming from opening 7a is entrained by the foil and is thus moved radially outwardly by centrifugal forces so that it establishes, in a known manner, an air gap which becomes shallower towards the edge of the foil and pulls the foil toward surface 7 so that the foil comes into a stable position.

Other air cushions are formed above the head levels of heads 6a and 6b which guide and support the foil along line S so that it curves downwardly from the straight crest line of the foil, which line also extends in direction S, toward both sides adjacent surface 7. This curvature, as known, results in an improvement of the stability of the position of the surface of the rotating foil.

It should here be noted that in this guide arrangement a curvature of bar surface 7, which can have various configurations, is generally advisable but not absolutely necessary since a planar bar surface, when the crest lines of the head levels of 6a and 6b are sufficiently higher than this surface, will also pull the foil 1 toward this surface to form an air gap and thus produce a curvature in the foil surface.

The space formed in the above-described arrangement between the foil and the bar surface 7 may be kept greater than in the known arrangements, in which the air gap lies underneath the entire foil surface, and this produces in the foil a reduction in the tendency to flutter as well as in the force required for driving the foil.

On the other hand the distance of the foil from the head level of the scanning head may be set at a favorable setting and may be kept small. The setting of this distance can be effected by adjusting the height of guide head 6b.

The head level of scanning head 6a preferably has a greater curvature than does the head level of guide head 6b. Thus the guiding air cushion has a smaller area at the head level of scanning head 6a than at the head level of guide head 6b, the pressure forces acting on the last-mentioned head level are stronger and can be used to set a very narrow air gap above the head level of scanning head 6a.

Due to the fact that no further active air gaps are present adjacent the head levels of heads 6a and 6b, the crest line S of the foil is also maintained at a stable location and no forces result which twist the position of this crest line in the direction of rotation of the foil.

It is also possible to make the scanning head 6a radially displaceable below the thus formed crest line S of the foil in order to effect spiral recordings or scanning. A recess 7b, shown in FIG. 1, can then be provided in guide bar 7 to provide room for the desired displacement of head 6a. To obtain proper operation of a system according to the invention as just described, the following values for the dimensions and parameters can be provided:

Diameter of the record carrier foil 170 mm;
thickness of the foil 100 – 150 μm;
material of the foil: Mylar.
Distance between the foil and the crest line of bar 7 about 1 – 3 mm;
distance between the foil and the head level of head 6b: 50 – 100 μm.
Cylindrical curvature of the head level of head 6b: Radius 40 – 80 mm, and of the head level of head 6a: Radius 20 – 30 mm.
Bar 7: cylindrical curvature, Radius about 300 mm.
Diameter of the clamping device 2: 22 mm;
diameter of the opening 7a: 30 mm.
Cycles per minute of the foil: 1000 – 5000.

It will be understood that the above description of the present invention is susceptible to various modifications, changes and adaptations, and the same are intended to be comprehended within the meaning and range of equivalents of the appended claims.

We claim:

1. In a system for guiding a rapidly rotating record carrier foil to give the foil a curvature which is stationary in space and which has a crest line disposed along a diameter of the foil, the foil being guided, to have such curvature, with the aid of a flow of air between the foil and guide surfaces, and the foil being not guided in regions angularly spaced from the guide surfaces and extending to the edge of the foil, wherein said guide surfaces comprise:

a bar located at that side of the foil location at which the foil presents a concave curvature, said bar presenting a surface adjacent the foil location which constitutes a guide surface, said bar being oriented with its length perpendicular to the orientation of the foil crest line and having a length greater than the diameter of the foil and a width less than the diameter of the foil; and two guide elements located entirely at that side of the foil location at which the foil presents a concave curvature, said elements being located at respectively opposite sides of said bar and of the axis of foil rotation and spaced from said bar, said guide elements each presenting a surface adjacent said foil location which constitutes a guide surface, at least one of said elements including a scanning head for information recorded on the foil.

2. An arrangement as defined in claim 1 wherein said bar guide surface has a substantially rectangular outline and has a width whose value is such, relative to the diameter of the foil, that the angles subtended by the arcs of the foil circumference which lie above said bar have a value of approximately 100°.

3. An arrangement as defined in claim 1 wherein the guide surface presented by said bar has a curved configuration, in the longitudinal direction of said bar, having the same direction of curvature as the foil.

4. An arrangement as defined in claim 1 wherein each of said guide elements includes mounting means permitting pivotal movement about an axis perpendicular to the foil crest line.

5. An arrangement as defined in claim 1 further including adjustment means permitting position adjustment of said guide elements in the direction perpendicular to the foil surface at the crest line.

6. An arrangement as defined in claim 1 further including means mounting said scanning head for movement perpendicular to the length of the bar and along the crest line.

7. An arrangement as defined in claim 1 wherein said guide elements have guide surfaces which effect the formation of a guiding air cushion.

8. An arrangement as defined in claim 7 wherein only one of said guide elements is a scanning head and the guide surface thereof has a greater curvature than does the guide surface of the other said guide element.

* * * * *